Patented Feb. 18, 1947

2,416,046

UNITED STATES PATENT OFFICE 2,416,046

PROCESS FOR THE PREPARATION OF ETHYLENEUREA

Harry R. Dittmar and Donald J. Loder, Wilmington, Del., assignors to E. I. du Pont de Nemours & Company, Wilmington, Del., a corporation of Delaware No Drawing. Application March 1, 1944, Serial No. 524,523

7 Claims. (Cl. 260—309)

This invention relates to a process for the preparation of N,N'ethyleneurea, and more particularly to its preparation from ethylene glycol and urea. This application is related to the copending applications of Loder and Larson et al., S. N. 524,520 and 524,524, respectively, filed on even date.

N,N'ethyleneurea, hereinafter referred to as ethyleneurea, and otherwise known as 2-oxo imidazolidin and imidazolidon 2), has been made by heating ethylenediamine with diethyl carbonate at 180° C. [E. Fisher, Koch, A 232, 227 (1886)], by warming an aqueous solution of N,N-ethylene thiourea with freshly precipitated mercuric oxid (Klut Ar. 240, 677 (1887)], and by distillation of aqueous N,N'ethylene guanidine under diminished pressure [Pierron A·9 (11) 363 (1908)].

An object of the present invention is to provide an improved process for the preparation of ethyleneurea. Another object of the invention is to provide a process for the preparation of ethyleneurea from ethylene glycol and urea. Yet another object is to provide procedural details for the preparation of ethyleneurea from ethylene glycol and urea. A further object is to provide a process for the preparation of ethyleneurea from mixtures of ethylene glycol and urea in which the urea may be present in excess. Other objects and advantages of the invention will hereinafter appear.

The above objects are realized by conducting the reaction of ethylene glycol with urea under a sufficiently high temperature, and for a sufficient period of time, to result in the conversion of the ethylene glycol and urea to ethyleneurea and/or a polymer-like product that can be subsequently converted to ethyleneurea. The reaction is conducted by charging a suitable converter, provided with or without a reflux condenser and an off-gas scrubber with ethylene glycol and urea. During the initial stages of the reaction under atmospheric pressure operation some glycol vapor is condensed in the reflux condenser and is returned to the reaction zone, while the remaining vapors, ammonia and carbon dioxide, pass through the reflux condenser to suitable scrubbers for their recovery. At the end of the reaction period, the product, under reaction temperature, is a viscous liquid which may be solid when cooled), which contains ethyleneurea, potential ethyleneurea and byproducts of the reaction.

The reaction is conducted at temperatures preferably ranging from about 150° C. to about 300° C. At temperatures above 300° C., however, the crude product is somewhat darkened in color, and accordingly it is found preferable to carry out the reaction at temperatures ranging between 200 and 300° C., the temperature being raised gradually to maximum temperature, the time required to heat the reactants from in the proximity of 125° C. to 175° C. being in the neighborhood of from 2 to 8 hours, and from 175 to 250° C. in the neighborhood of from 2 to 6 hours, the total time of reaction ranging from 2 to 24 hours. It has been found that the reaction mixture of ethylene glycol and urea should be heated for optimum yields to a temperature of at least 225° C. and preferably 240° C. prior to the termination of the reaction, irrespective of the ratio of reactants. Pressures above atmospheric may be used say from 3 to 1500 atmospheres in which case condenser and scrubber equipment is superfluous.

The reaction of ethylene glycol with urea to give ethyleneurea appears, relatively speaking, to be a slow reaction. It has been found, for example, that under atmospheric pressure operation with a 3 urea to 1 glycol ratio on a molecular weight basis, appreciable quantities of ethyleneurea can be obtained in a matter of 5 to 15 hours, by gradually heating to a maximum temperature of about 175° C., while, on the other hand, with a ratio of 1 mole of glycol per mole of urea, under similar pressure, by gradually heating for a period of approximately 7 hours to a maximum temperature of 210° C., only 10% as much ethyleneurea is obtained. It follows, therefore, that under atmospheric pressure the higher the urea content at a given temperature the faster the ethylene glycol and urea to ethylene urea reaction. Accordingly when conducting the reaction of a mixture having a ratio in the order of 1 mole glycol to 1 mole urea, or higher glycol, a considerably longer reaction time at a given temperature is recommended than for a reaction in which the urea is present in a ratio of 3 moles thereof per mole of glycol or higher urea content. Furthermore, the reaction is more rapid, the higher the temperature, and accordingly, with any given glycol to urea ratio, the reaction time may be decreased with increase in temperature.

The grade of the glycol employed is not critical, although pure ethylene glycol will give most satisfactory results. The urea employed should, for the best results, likewise be pure, although normally occurring impurities found in synthetic urea do not appear to deleteriously affect the reaction.

It has been found that the ratio of urea to ethylene glycol on a weight basis should, for optimum results under atmospheric pressure operation, range from 1 mole of urea upward per mole of glycol and generally between from 2 to 8 moles of the urea per mole of the ethylene glycol, with the preferred range between 3 and 6 moles of the urea per mole of the glycol. The solution of urea in ethylene glycol should preferably contain at least 15% of ethylene glycol by weight, to give a flowable fluid if the reactants are to be transported by pumping. With higher urea content, say above 5 urea:1 glycol, a mutual inert solvent may be added such as 1,4-dioxolane, dimethyl ether of ethylene glycol and similar solvents.

The converter in which the reaction may be carried out should preferably be constructed or lined with silver, chromium, chrome steel, or constructed of corrosion-resisting material in order to resist the corrosive action of the reactants.

The ethyleneurea may be separated from the crude reaction mixture by steam distillation, i. e. by heating up the mixture to distillation temperature while passing steam through it or by vacuum distillation. Alternatively, the crude product may be subjected to crystallization for the separation of ethyleneurea, the crystallization being conducted in a suitable solvent therefor.

The examples illustrate preferred embodiments of the invention wherein parts are by weight unless otherwise indicated.

*Example I.*—A silver-lined autoclave, provided with a reflux condenser was charged with 1760 parts of urea dissolved in 520 parts of ethylene glycol (molecular weight ratio of urea: glycol, 3.5:1), and a solution of the urea in the ethylene glycol was effected at a temperature of approximately 140° C. The resulting solution was heated gradually from solution temperature to 180° C. in about 6.5 hours; from 175° C. to a maximum temperature of 240° C. in about 3 hours; and was held at 240° C. for about 1 hour. Ethyleneurea was steam distilled from the reaction mixture and obtained in a yield of about 42% based on glycol.

*Example II.*—360 parts of urea was dissolved in 93 parts of ethylene glycol giving a molar ratio of 4 to 1 urea to glycol and the resulting mixture heated in a suitable reaction vessel at a temperature between 160 to 180° C. for 6.5 hours, at a temperature of 240° C. for one hour. The crude melt was recovered in the amount of 172 parts and subjected to vacuum distillation for the recovery of ethyleneurea. The conversion of ethylene glycol to ethyleneurea was approximately 25%.

Table I represents a series of examples conducted substantially in accord with the procedure described in Example I, except for the variations in concentrations, temperatures and other items noted.

Table I

| Examples Nos. | 3 | 4 | 5 | 6 | 7 |
|---|---|---|---|---|---|
| Charge, parts by weight: | | | | | |
| Urea | 77.2 | 12.02 | 12.02 | 80.0 | 12.02 |
| Glycol | 22.8 | 3.55 | 4.15 | 16.5 | 2.49 |
| Urea/glycol (mole per mole) | 3.5 | 3.5 | 3.0 | 5.0 | 5.0 |
| Reaction: | | | | | |
| 1. Pot temp. at start, ° C | 140 | 150 | 130 | 150 | 150 |
| 2. Pot temp. at end, ° C | 253 | 250 | 240 | 205 | 273 |
| 3. Time to 175° C., hrs | 8.5 | 9 | 6.8 | 9¼ | 8½ |
| 4. Time 175° C. to max. temp., hrs | 5.5 | 4½ | 4.0 | 4¼ | 4 |
| 5. Time at max. temp., hrs | 4.5 | 2 | 0.8 | 0 | 1 |
| Product: | | | | | |
| 1. Conversion of glycol to ethyleneurea | 44.2 | 42 | 50 | 45 | 36 |

We claim:

1. In a process for the preparation of ethyleneurea the step which comprises subjecting to at least 175° C. from 2 to 8 moles of urea per mole of ethylene glycol.

2. A process for the preparation of ethyleneurea which comprises gradually heating a solution containing from 2 to 8 moles of urea per mole of ethylene glycol, from solution temperature to a temperature between 200 and 300° C. over a period of from 2½ to 24 hours and recovering ethyleneurea from the reaction mixture.

3. A process for the preparation of ethyleneurea which comprises dissolving 3.5 moles of urea in 1 mole of ethylene glycol at about 140° C., heating the resulting solution from solution temperature to 180° C. in about 6½ hours, from 175° C. to 240° C. in about 3 hours, boiling the mixture at about 240° C. for about 1 hour and recovering ethyleneurea from the reaction mixture.

4. A process for the preparation of ethyleneurea which comprises subjecting from 2 to 8 moles of urea per mole of ethylene glycol to a temperature of at least 200° C. and recovering ethyleneurea from the reaction mixture.

5. A process for the preparation of ethyleneurea which comprises dissolving from 2 to 8 moles of urea per mole of ethylene glycol in ethylene glycol, heating the resulting solution to a temperature between 200 and 300° C., and recovering the ethyleneurea from the reaction mixture.

6. A process for the preparation of ethyleneurea which comprises heating from 2 to 8 moles of urea per mole of ethylene glycol to from 125° C. to 175° C. over a period of from 2 to 8 hours, and from 175° C. to a temperature of 250° C. over a period of from 2 to 6 hours and recovering ethyleneurea from the reaction mixture.

7. A process for the preparation of ethyleneurea which comprises heating from 2 to 8 moles of urea per mole of ethylene glycol to a temperature of at least 225° C. for at least 2 hours and recovering ethylene glycol from the reaction mixture.

HARRY R. DITTMAR.
DONALD J. LODER.

REFERENCES CITED

The following references are of record in the file of this patent:

UNITED STATES PATENTS

| Number | Name | Date |
|---|---|---|
| 1,924,253 | Paquin | Aug. 29, 1933 |
| 1,986,067 | Paquin | Jan. 1, 1935 |
| 2,155,328 | Paquin | Apr. 18, 1935 |
| 1,902,889 | Paquin | Mar. 28, 1933 |